Jan. 1, 1957      M. T. STURR      2,776,358
FRANKFURTER COOKER
Filed Feb. 23, 1954
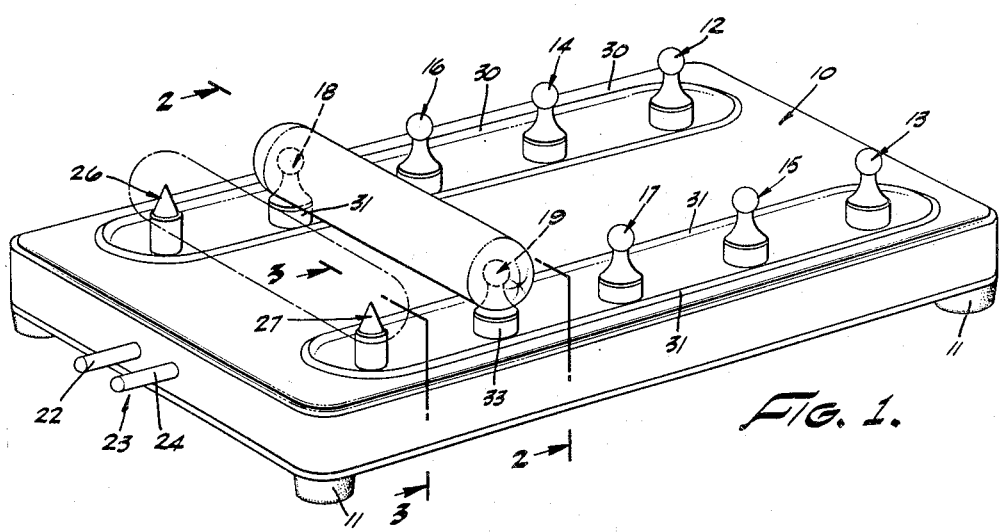
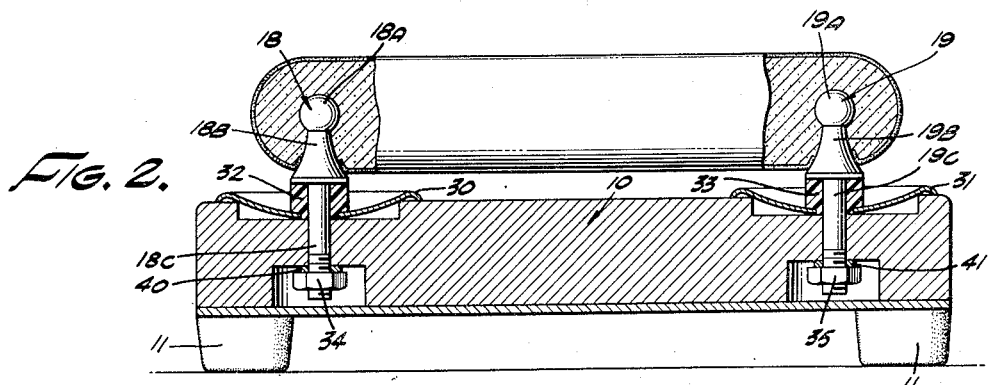
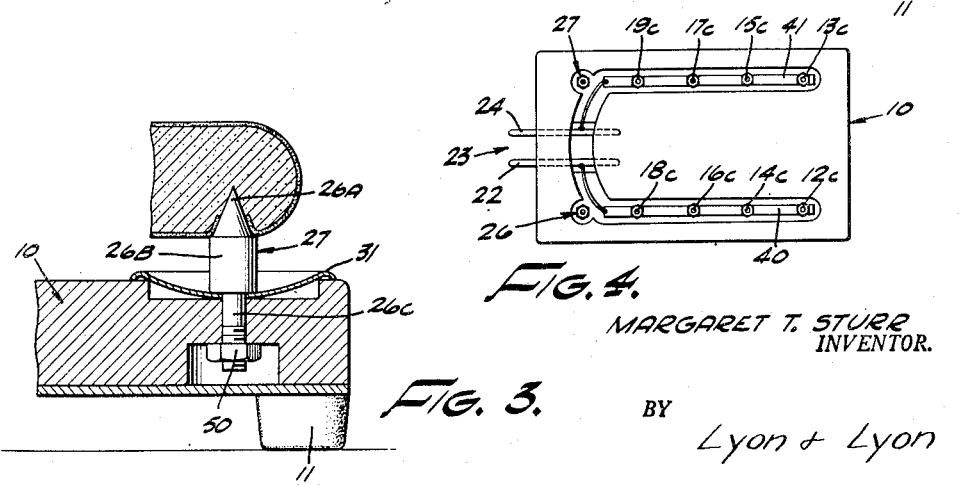
MARGARET T. STURR
INVENTOR.
BY
Lyon & Lyon
ATTORNEYS

United States Patent Office 2,776,358
Patented Jan. 1, 1957

2,776,358

FRANKFURTER COOKER

Margaret T. Sturr, Los Angeles, Calif., assignor of one-third to George B. T. Sturr, Los Angeles, Calif., and one-third to Robert P. Sturr, Jr., Rosemont, Pa.

Application February 23, 1954, Serial No. 411,705

6 Claims. (Cl. 219—19)

The present invention relates to an improved frankfurter cooker.

An object of the present invention is to provide an improved frankfurter cooker which has an improved electrode structure for assuring good electrical connection during the cooking interval.

Another object of the present invention is to provide an improved frankfurter cooker having an improved electrode structure for mechanically maintaining the frankfurter in place during the cooking interval, during which the frankfurter tends to move or bend.

Another object of the present invention is to provide a frankfurter cooker characterized by its simplicity.

Another object of the present invention is to provide an improved frankfurter cooker incorporating means for assuring good electrical contact between the electrode structure and the frankfurter during the cooking interval.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a perspective view showing a frankfurter cooker embodying features of the present invention.

Figures 2 and 3 are sectional views taken substantially on the lines 2—2 and 3—3 of Figure 1.

Figure 4 illustrates the manner in which the various electrodes are connected.

The frankfurter cooker comprises a base 10 of suitable insulating material supported on four feet 11 disposed near the bottom corners of the rectangular insulated base 10. Mounted on such base are four pairs of electrodes. A first pair comprises the electrodes 12 and 13, a second pair comprises the electrodes 14 and 15, a third pair comprises the electrodes 16 and 17 and the fourth pair comprises electrodes 18 and 19. The electrodes 12, 14, 16 and 18 are each connected to one terminal 22 of the power input connector 23 which has its other terminal 24 connected electrically to the other electrodes 13, 15, 17 and 19 as shown in Figure 4. Also mounted on the base 10 is a pair of impaling standards 26 and 27 which perform a mechanical function only, namely, to pierce opposite ends of the frankfurter in a preliminary operation prior to placement of the frankfurter on the ball-shaped electrodes. The piercing standards 26 and 27, as shown in the drawings, have conical ends terminating in a sharp point, and such standards 26 and 27 are spaced the same distance apart as are any one of the previously mentioned pairs of cooking electrodes, for example, the pair of electrodes 18 and 19. The cooking electrodes have ball-shaped ends which are inserted into the holes previously made in the frankfurter by the conical standards 26 and 27.

As shown in Figure 2, the electrodes 18 and 19 have ball-shaped ends 18A and 19A integrally formed with a generally conical base 18B and 19B and integrally formed threaded shanks 18C and 19C. The base 10 is recessed longitudinally to accommodate the metal trays 30 and 31 of stainless steel which serve to gather juices which are cooked out of the frankfurter during the cooking interval. These metal trays 30 and 31, however, are insulated from the electrodes by insulating bushings 32 and 33, respectively, each having a portion of reduced diameter passing through an apertured portion in the trays 30 and 31, as shown in Figure 2. The electrodes, insulating bushings and trays are maintained in position by fastening nuts 34 and 35 which are recessed in the base 10 and are threaded on the shanks 18C and 19C, respectively, with the electrical connecting strips 40 and 41 sandwiched between the nuts 34, 35 and the base 10, respectively.

The piercing standards 26 and 27 are secured to the base, as illustrated in Figure 3. Such piercing standard shown in Figure 3 has a conical-shaped end 26A integrally formed with the cylindrical base 26B and threaded shank 26C. The shank passes through an apertured portion of the tray 30 and through an apertured portion in the base 10, and is secured by the nut 50 threaded on the shank and recessed in the base 10.

One important feature of the present invention resides in the shape of the electrodes 16 and 17 which serve generally two functions, namely, to secure the frankfurter in place mechanically to resist appreciable movement of the frankfurter as it is being cooked, and secondly, to maintain a good electrical contact with the frankfurter during the cooking interval. These two functions are accomplished largely due to the fact that the ends of the electrodes are ball-shaped and provide a re-entrant portion in cross section at the junction of the ball-shaped end 19A with the conical base 19B. Since the electrodes are ball-shaped, it is desirable that they be pre-pierced to facilitate placement of the frankfurter on the electrodes without unduly splitting the ends of the frankfurter. Hence the cooker preferably incorporates the piercing standards 26 and 27. In this respect, it is noted that the diameter of the base of the conical tip 26A is substantially equal to the diameter of the electrode ball end 19A.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A frankfurter cooker comprising a base, a pair of electrodes mounted on said base, each of said electrodes having a generally conical base integrally formed with a ball-shaped tip, with said tip and base being arranged to enter and engage a frankfurter so as to hold the same while the same tends to be deformed while being heated, said conical base and ball shaped tip being contiguous and both being engageable with the end of a frankfurter during cooking of the same.

2. A frankfurter cooker comprising a base, a first series of electrodes electrically connected together on said base, a second series of electrodes electrically connected together on said base, said base being of insulating material, a drip tray disposed between said base and said first series of electrodes, a second trip tray disposed between said base and said second series of electrodes, means insulating said first tray from said base, means insulating said second tray from said base, and each of said electrodes having generally a conical base terminating in a ball-shaped tip, with said tip and base being arranged to enter and engage a frankfurter so as to hold the same while the same tends to be deformed while being heated.

3. In a frankfurter cooker of the character described, a base, a pair of standards mounted on said base, each having conical-shaped ends for piercing a frankfurter, a pair of electrodes mounted on said base and each having generally a conical base terminating in a ball-shaped tip, the diameter of the ball-shaped tip being substantially equal to the diameter of the base of the conical standard, with said tip and base being arranged to enter and engage a frankfurter so as to hold the same while the same tends to be deformed while being heated.

4. A frankfurter cooker comprising a base, a pair of electrodes mounted on said base, each of said electrodes having a conical-shaped base terminating with a ball-shaped tip, with said tip and base being arranged to enter and engage a frankfurter so as to hold the same while the same tends to be deformed while being heated, said conical base and ball shaped tip being contiguous and both being engageable with the end of a frankfurter during cooking of the same.

5. A frankfurter cooker comprising an insulating base, a pair of drip trays recessed in the upper surface of said base, a pair of electrodes mounted on said base and extending through an apertured portion in a different one of said trays, each electrode comprising a generally conical-shaped base with an integrally formed ball-shaped tip and a fastening shank, an insulating washer disposed between a corresponding conical-shaped base and a corresponding tray for insulating the electrode from the corresponding tray, said shank passing through said insulating washer and said tray and being threaded, the bottom surface of said base being provided with a recessed portion, a nut disposed in said recessed portion and threaded on said shank for securing said electrode to said base, with said tip and base being arranged to enter and engage a frankfurter so as to hold the same while the same tends to be deformed while being heated.

6. A frankfurter cooker comprising a base, a pair of electrodes mounted on said base, each of said electrodes having a conical shaped base portion contiguous with an outwardly extending ball shaped portion, said conical shaped base portion and said ball shaped portion both being engageable simultaneously with the end of a frankfurter during cooking of the same.

References Cited in the file of this patent

UNITED STATES PATENTS

| | | |
|---|---|---|
| 2,083,717 | Kohn | June 15, 1937 |
| 2,152,314 | Kohn | Mar. 28, 1939 |
| 2,200,406 | Watson | May 14, 1940 |
| 2,474,390 | Aff | June 28, 1949 |